United States Patent
Ohashi et al.

(10) Patent No.: US 7,987,996 B2
(45) Date of Patent: Aug. 2, 2011

(54) FILTER MEDIUM, FLUID FILTER, AND ENGINE OIL FILTER

(75) Inventors: Yoshihiro Ohashi, Aichi-ken (JP); Shin Bando, Tokushima-ken (JP); Masahumi Suzuki, Tokushima-ken (JP)

(73) Assignees: Toyota Boshoku Kabushiki Kaisha, Aichi-Ken (JP); Awa Paper Mfg. Co., Ltd., Tokushima-Ken (JP)

(*) Notice: Subject to any disclaimer, the term of this patent is extended or adjusted under 35 U.S.C. 154(b) by 654 days.

(21) Appl. No.: 12/135,411

(22) Filed: Jun. 9, 2008

(65) Prior Publication Data
US 2008/0314821 A1 Dec. 25, 2008

(30) Foreign Application Priority Data
Jun. 20, 2007 (JP) .................. 2007-163079

(51) Int. Cl.
*B01D 39/16* (2006.01)
*B01D 39/04* (2006.01)
*B01D 39/14* (2006.01)
*B01D 39/18* (2006.01)

(52) U.S. Cl. ........ 210/503; 210/483; 210/488; 210/489; 210/491; 210/496; 210/504; 210/505; 210/508

(58) Field of Classification Search ............... 210/483, 210/488, 489, 491, 496, 503, 504, 505, 508
See application file for complete search history.

(56) References Cited

U.S. PATENT DOCUMENTS

| 5,057,368 A | 10/1991 | Largman et al. |
| 7,314,497 B2 * | 1/2008 | Kahlbaugh et al. ............. 55/527 |
| 2008/0141637 A1 | 6/2008 | Hirata et al. |
| 2008/0148699 A1 | 6/2008 | Sazawa et al. |
| 2008/0156720 A1 | 7/2008 | Ohashi |

FOREIGN PATENT DOCUMENTS

| JP | 5-49825 | 3/1993 |
| JP | 9-841 | 1/1997 |
| JP | 9-29021 | 2/1997 |
| JP | 2000-93718 | 4/2000 |
| JP | 2002-129433 | 5/2002 |
| JP | 2007-167788 | 7/2007 |

OTHER PUBLICATIONS

English language Abstract of JP 9-841, Jan. 7, 1997.
English language Abstract of JP 5-49825, Mar. 2, 1993.
English language Abstract of JP 2007-167788, Jul. 5, 2007.
English language Abstract of JP 9-29021, Feb. 4, 1997.
English language Abstract of JP 2000-93718, Apr. 4, 2000.
English language Abstract of JP 2002-129433, May 9, 2002.

* cited by examiner

*Primary Examiner* — John Kim
(74) *Attorney, Agent, or Firm* — Greenblum & Bernstein, P.L.C.

(57) ABSTRACT

A filter medium comprises a modified cross-section fiber (A) having a fiber diameter between 40 and 70 μm, an extremely fine fiber (B) having a fiber diameter of more than 5 μm and no more than 10 μm and a modified cross-section fiber (C) having a fiber diameter between 15 and 30 μm, the content of the extremely fine fiber (B) is between 3 and 10% by mass, and the content of the modified cross-section fiber (C) is between 5 and 15% by mass based on 100% by mass of total the fibers in the filter medium.

18 Claims, 1 Drawing Sheet

FILTER MEDIUM, FLUID FILTER, AND ENGINE OIL FILTER

INCORPORATION BY REFERENCE

The disclosure of Japanese Patent Application No. 2007-163079 filed on Jun. 20, 2007 including the specification, drawings and abstract is incorporated herein by reference in its entirety.

BACKGROUND OF THE INVENTION

1. Field of the Invention

The present invention relates to a filter medium, a fluid filter, and an engine oil filter. More particularly, the present invention relates to a filter medium that exhibits high filtering efficiency and has a long filter life, as well as a fluid filter and an engine oil filter including this filter medium.

2. Description of the Related Art

Various filters are used conventionally to remove microparticles and the like from a fluid. For example, lubricating oil used in an internal combustion engine contains suspended sludge, dust particles, metal dust, carbon particles generated as a result of incomplete combustion, and so on. When these particles exist, problems such as an increase in the viscosity of the lubricating oil, defective lubrication of the engine, and a reduction in the life of the lubricating oil arise. To remove these particles from the lubricating oil, an oil filter is used. In addition, an air filter, a liquid filter (for example, a fuel filter or a hydraulic filter for large-scale civil engineering/construction machines and the like) are also used. An air filter is capable of trapping dust particles in the air. A liquid filter is capable of removing particles contained in a liquid with a high degree of efficiency so that a pure liquid can be obtained.

Resin-treated filter paper, nonwoven fabric, felt, and so on are typically employed as filter media for use in a filter. For example, JP-A-H9-841 discloses a filter medium constituted by fibrillated organic fibers, extremely fine organic fibers, crimped fibers or fibers having a modified cross-section and a specific maximum projection diameter, and a fibrous organic binder or a liquid binder. In this filter medium, the extremely fine organic fibers construct networks between the fibrillated organic fibers. As a result of this network construction, the filter medium described in JP-A-H9-841 achieves an increase in the fineness of the filter pores, thereby improving the filtering efficiency.

Exhaust gas recirculation (EGR) systems which extract a part of the exhaust gas from an exhaust system and recirculate it to an intake system are being introduced into automobile engines. In an engine installed with an EGR system, the amount of microparticles such as carbon sludge contained in the lubricating oil is presumed to increase as the EGR ratio (EGR amount/intake air amount) increases. Furthermore, due to improvements in lubricating oil, the microparticles are more easily dispersed, and therefore the carbon sludge contained in the lubricating oil is showing a tendency to increase in fineness. For these reasons, there is demand for an automobile engine filter and a filter medium that can trap carbon sludge and other microparticles more reliably. Moreover, the demand for a filter and a filter medium exhibiting superior filtering efficiency is not limited to the automotive field, and extends to various other technical fields.

Reducing the pore diameter of a filter medium has been proposed in the related art as a method of improving the filtering efficiency of the filter medium. However, when the pore diameter of the filter medium is reduced, the filter life is shortened, leading to an increase in the frequency with which the filter must be replaced. Hence, there is demand for a filter medium that exhibits superior filtering efficiency and also has a long filter life.

In the filter medium described in JP-A-H9-841, aromatic polyamide fiber is preferably employed as the organic fiber. However, aromatic polyamide fiber has a large specific gravity and exhibits poor hydrophilicity. A filter medium is typically formed by making a slurry containing fibers into paper using a net. The poorly hydrophilic fibers and heavy fibers immediately accumulate in the slurry. Hence, in a case where aromatic polyamide fibers are used, the fibers accumulate during manufacture of the filter without sufficient voids between the fibers, and therefore the voids required for the extremely fine organic fibers to disperse cannot be secured sufficiently. As a result, unless a large amount of extremely fine organic fibers is introduced, networks are not formed among the extremely fine organic fibers, and therefore sufficient filtering efficiency and a sufficiently long filter life cannot be achieved. On the other hand, when a large amount of extremely fine organic fibers is introduced, the strength of the filter medium decreases, which is highly problematic in terms of practical application. Moreover, aromatic polyamide fiber is not sufficiently hydrophilic, as noted above, and therefore does not disperse favorably in water. As a result, the extremely fine organic fibers cannot be dispersed sufficiently, and networks cannot be formed among the extremely fine organic fibers. Due to these factors, it is difficult to manufacture a filter medium having a bulky structure using the fiber compositions of the related art.

SUMMARY OF THE INVENTION

An object of the present invention is to provide a filter medium exhibiting high filtering efficiency and having a long filter life, as well as a fluid filter and an engine oil filter including this filter medium.

A filter medium according to the present invention contains a modified cross-section fiber (A) (to be referred to hereafter as "fiber (A)") having a fiber diameter between 40 and 70 μm, an extremely fine fiber (B) (to be referred to hereafter as "fiber (B)") having a fiber diameter of more than 5 μm and no more than 10 μm, and a modified cross-section fiber (C) (to be referred to hereafter as "fiber (C)") having a fiber diameter between 15 and 30 μm, wherein the content of the fiber (B) is between 3 and 10% by mass, and the content of the fiber (C) is between 5 and 15% by mass based on 100% by mass of total said fibers in said filter medium.

A fluid filter and an engine oil filter according to the present invention include the filter medium of the present invention.

By having the constitution described above, the voids required to disperse the extremely fine fiber can be secured in the filter medium of the present invention, and the extremely fine fiber can be dispersed evenly. Hence, extremely fine filter pores can be formed, and a bulky filter medium can be obtained. As a result, the filtering efficiency can be improved, and the filter life can be extended.

Moreover, the filter medium and the engine oil filter of the present invention include the filter medium of the present invention, and therefore exhibit high filtering efficiency and have a long filter life.

DETAILED DESCRIPTION OF THE PREFERRED EMBODIMENTS

[1] Filter Medium

Figure 1:
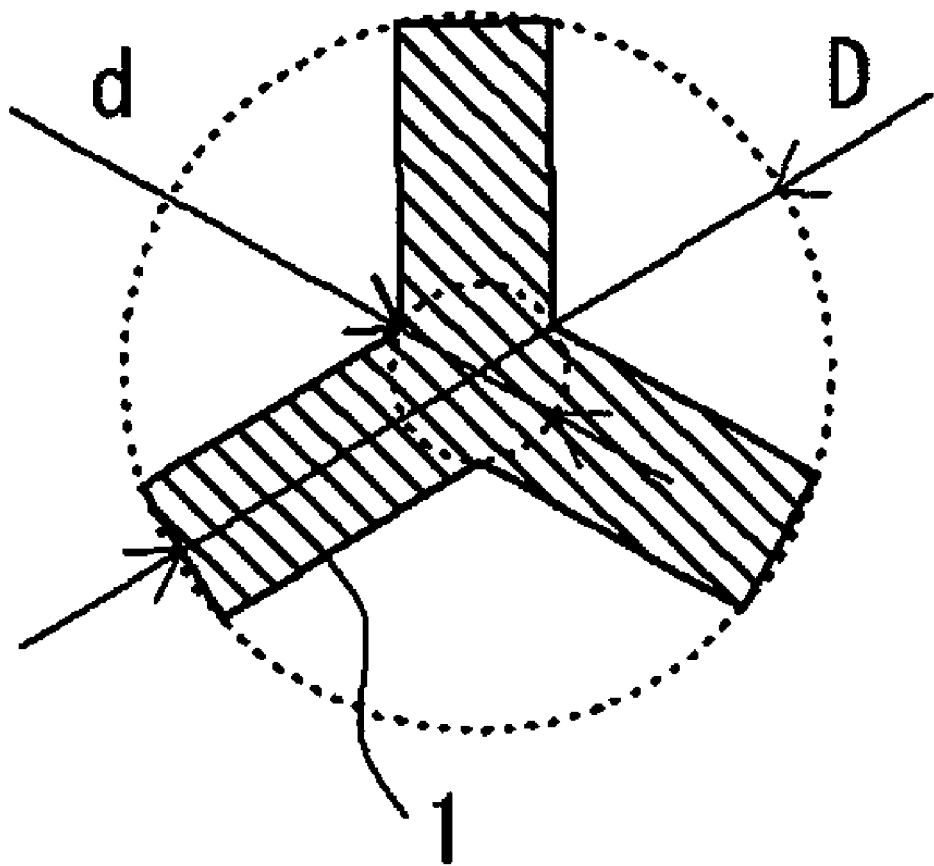
FIG. 1 is a schematic cross-sectional view of a modified cross-section fiber for illustrating the degree of modification of the modified cross-section fibers.

The filter medium of the present invention contains fibers (A), and therefore the voids required to disperse fibers (B) can be secured sufficiently. Furthermore, since the filter medium of the present invention contains the fibers (A), sludge and other microparticles can be trapped reliably even at a high flow velocity. Moreover, the filter medium of the present invention contains fibers (C), which have a smaller fiber diameter than the fibers (A), and therefore the filter life can be extended while maintaining superior filtering efficiency. Note that this description is a presumption of the inventor, and is not intended to limit the present invention.

(1) Fibers (A) and (C)

The fibers (A) and (C) are modified cross-section fibers, or in other words fibers having projections at fixed intervals in a circumferential direction. The degree of modification of the fibers (A) and (C) may be set at typically no less than 0.7, preferably no less than 0.75, and more preferably no less than 0.8. Note that the degree of modification is calculated on the basis of an inscribed circle diameter (d) of the cross-section of the modified cross-section fiber (1) and a circumscribed circle diameter (D) of the cross-section of the modified cross-section fiber (1) using the following equation (see FIG. 1).

$$\text{Degree of modification} = 1 - (d/D)^2$$

In the fibers (A) and (C), there are no particular limitations on the number of projections. The number of projections is typically between 3 and 5. More specifically, fibers having a T-shaped cross-section, an X-shaped cross-section, a Y-shaped cross-section, an H-shaped cross-section, a star-shaped cross-section, and so on may be cited as examples of the fibers (A) and (C). In U.S. Pat. No. 5,057,368, modified cross-section fibers having a cross-sectional shape that includes a plurality of T-shaped arm portions are disclosed as modified cross-section fibers. As described above, a filter medium is typically formed in a paper-making process. When making the filter medium, a binder material is usually used. To obtain a filter medium using the fibers described in U.S. Pat. No. 5,057,368, the binder material is filled into gaps formed by the arm portions of the T shape, and as a result, the filtering efficiency and filter life tend to decrease. Therefore, the cross-sectional shape of the fibers (A) and (C) is preferably an X shape, a Y shape, an H shape, or a star shape.

The respective cross-sectional shapes of the fibers (A) and (C) may be identical or different. For example, both the fiber (A) and the fiber (C) may be formed with an X-shaped cross-section. Alternatively, either one of the fiber (A) or the fiber (C) may be formed with an X-shaped cross-section, and the other may be formed with a Y-shaped, H-shaped or star-shaped cross-section.

The fiber diameter of the fiber (A) is between 40 and 70 µm, preferably between 40 and 65 µm, and more preferably between 45 and 60 µm. When the fiber diameter of the fiber (A) is less than the lower limit value, the filter life of the filter medium decreases, which is undesirable. When the fiber diameter of the fiber (A) exceeds the upper limit value, on the other hand, it becomes difficult to fix the fiber (A) in the filter medium using the binder material, and as a result, fuzz occurs on the filter medium surface, which is undesirable. Note that the "fiber diameter" of the fiber (A) denotes the diameter of the circumscribed circle of the cross-section.

There are no particular limitations on the ratio between the fiber diameter of the fiber (A) and the fiber diameter of the fiber (B). For example, the fiber diameter of the fiber (A) may be set between 5 and 15 times, preferably between 6 and 10 times, and more preferably between 7 and 10 times the fiber diameter of the fiber (B).

The fiber diameter of the fiber (C) is between 15 and 30 µm, preferably between 15 and 25 µm, and more preferably between 17 and 25 µm. When the fiber diameter of the fiber (C) is less than the lower limit value, the strength and filter life of the filter medium decrease, which is undesirable. When the fiber diameter of the fiber (C) exceeds the upper limit value, on the other hand, the filtering efficiency deteriorates, which is undesirable. Note that the "fiber diameter" of the fiber (C), similarly to the "fiber diameter" of the fiber (A), denotes the diameter of the circumscribed circle of the cross-section.

There are no particular limitations on the ratio between the fiber diameter of the fiber (C) and the respective fiber diameters of the fiber (A) and the fiber (B). For example, the fiber diameter of the fiber (C) may be set between 3 and 10 times, preferably between 3 and 8 times, more preferably between 3 and 6 times, even more preferably between 3.1 and 5 times, and particularly preferably between 3.1 and 4.5 times the fiber diameter of the fiber (B). The fiber diameter of the fiber (C) may be set at more than ⅕ times and no more than ¾ times, preferably between ¼ and ⅔ times, and more preferably between ⅓ and ⅗ times the fiber diameter of the fiber (A).

There are no particular limitations on the properties of the fibers (A) and (C). For example, the specific gravity of the fibers (A) and (C) is typically between 0.5 and 1.3, preferably between 0.5 and 1.1, more preferably between 0.7 and 1.1, and even more preferably between 0.7 and 1.0. When the specific gravity is within this range, the fibers (A) and (C) are dispersed through the slurry appropriately such that the voids required to disperse the fibers (B) can be secured sufficiently. As a result, a bulkier filter medium structure can be obtained, and the filtering efficiency and filter life of the filter medium can be improved. Polypropylene or the like may be cited as an example of a material having a specific gravity within this range.

There are no particular limitations on the respective shapes of the fibers (A) and (C). Crimped fibers that have been crimped through twisting processing or the like may be used as the modified cross-section fiber. When crimped fibers are used, larger gaps can be formed by the fibers (A) and (C), and the fibers (B) can be dispersed through the filter medium. Therefore, crimped fibers are preferable.

There are no particular limitations on the material of the fibers (A) and (C). Fibers made of various materials may be used as the fibers (A) and (C) as necessary. The fibers (A) and (C) are typically synthetic fibers. Examples of these synthetic fibers include polyester such as polyethylene terephthalate, polyolefin such as polyethylene, and polyvinyl alcohol ("Vinylon", manufactured by Unitika Ltd., or the like).

Fiber made from a material exhibiting superior hydrophilicity (hydrophilic fiber) may be used as the fibers (A) and/or (C). Hydrophilic fiber disperses favorably through water, and therefore, when the fibers (A) and/or (C) contain this type of fiber, the extremely fine fiber (B) can be dispersed evenly. As a result, fiber networks can be constructed. Furthermore, oil filter media that do not use metallic components and oil filter media having metallic components that can be separated easily by a manual operation are currently employed to facilitate the incineration of an oil filter medium. This type of oil filter medium can be incinerated easily. Hydrophilic fiber generates fewer harmful gases, such as NH and CNx, during incineration than aromatic polyamide fiber and the like. Hence, the filter medium can be incinerated easily, and can therefore be applied to a filter medium that is disposed of through incineration.

Polyvinyl alcohol ("Vinylon", manufactured by Unitika Ltd., or the like) may be cited as an example of hydrophilic fiber. Also, hydrophilization treated fiber, which is obtained by subjecting fiber to hydrophilization processing, may be used as hydrophilic fiber. Examples of this fiber include polyolefin fiber (polyethylene, polypropylene, and copolymer or terpolymer of propylene and an α-olefin other than a propylene such as an ethylene), and polyester fiber (polyethylene terephthalate, polybutylene terephthalate, and so on).

Examples of hydrophilization processing include hydrophilicity imparting agent processing, hydrophilic coating, hydrophilic vinyl monomer graft polymerization processing, sulfonation processing, fluorine gas processing, and discharge processing.

Hydrophilicity imparting agent processing is processing to adhere a hydrophilicity imparting agent to or incorporate the hydrophilicity imparting agent into the fiber. There are no limits on the method of the hydrophilicity imparting agent processing as long as the hydrophilicity imparting agent can be adhered to or incorporated into the fiber. The following methods may be cited as a specific examples of hydrophilization processing using a hydrophilicity imparting agent. Note that in hydrophilicity imparting agent processing, one or more hydrophilicity imparting agents may be used.

(1) A method of spraying the hydrophilicity imparting agent or a liquid containing the hydrophilicity imparting agent on the fiber.
(2) A method of coating the fiber with the hydrophilicity imparting agent or a liquid containing the hydrophilicity imparting agent.
(3) A method of submerging the fiber in a hydrophilic oil solution or a liquid containing the hydrophilic oil solution.
(4) A method of kneading a powder-form, pellet-form, or liquid hydrophilicity imparting agent into the fiber raw material and then spinning the material so that the hydrophilic oil solution is incorporated into the fiber.

The hydrophilicity imparting agent may be any compound containing a hydrophilic group such as a hydroxyl group, a carbonyl group, a carboxyl group, and a sulfone group. An example of the hydrophilicity imparting agent is a surfactant (anionic, cationic, nonionic, and zwitterionic). Examples of the nonionic surfactant include a polyglycerol fatty acid ester, a fatty acid glyceride, an alkylphenol alkykoxylate, a polyoxyalkylene fatty acid ester, and a fatty acid diethanolamide. An example of the anionic surfactant is an anionic surfactant containing a sulfuric ester salt group, a C8-C30 alkyl phosphate ester salt group, a C8-C12 alkyl phosphate alkali metal salt, a sulfate base, and so on. The hydrophilicity imparting agent may also be a betaine surfactant, a polyoxyethylene alkyl ether, a polyoxyethylene sorbitan monooleate, a sorbitan monooleate, a polyoxyalkylene-modified organosiloxane, a compound of an alkyrol amide-based compound and polyoxyalkylene-modified organosiloxane, a polyglycerol fatty acid ester or a compound of a polyglycerol fatty acid ester and polyoxyalkylene-modified organosiloxane, a polyether-polyester block copolymer or a compound of a polyether-polyester block copolymer and polyoxyalkylene-modified organosiloxane, and a compound of a surfactant having a hydrocarbon group with a C28 or more as a hydrophobic group and polyoxyalkylene-modified organosiloxane, and so on.

During hydrophilization processing using the hydrophilic oil solution, the amount of adhered or incorporated hydrophilic oil solution relative to 100 parts by mass of the fiber to be processed is normally set between 0.1 and 3 parts by mass, preferably between 0.2 and 2 parts by mass, more preferably between 0.3 and 1 part by mass, and even more preferably between 0.3 and 0.8 parts by mass. When the amount of adhered or incorporated hydrophilic oil solution is within this range, the hydrophilic fiber disperses appropriately, and an appropriate degree of hydrophilicity is obtained.

Polyolefin fiber such as polypropylene fiber treated with a hydrophilicity imparting agent may be cited as an example of the hydrophilic fiber that is obtained as a result of hydrophilization processing employing the hydrophilicity imparting agent described above. More specifically, hydrophilic polyolefin fiber using a surfactant as the hydrophilicity imparting agent and formed by adhering the surfactant to or incorporating the surfactant into the polyolefin fiber may be cited as an example thereof. Hydrophilic polyolefin fiber obtained by performing hydrophilization processing using the anionic surfactants and/or the nonionic surfactants described above as the hydrophilicity imparting agent can be employed particularly favorably. When the fiber contained in the filter medium is assumed to total 100% by mass, the polyolefin content of the hydrophilicity imparting agent-treated polypropylene fiber or the like may typically be set between 3 and 7% by mass, and preferably between 4 and 7% by mass.

The hydrophilic coating is a method of imparting hydrophilicity by coating the fiber surface with hydrophilic resin such that the hydrophilic resin is adhered thereto. Examples of the hydrophilic resin include carboxymethyl cellulose, carboxyethyl cellulose, polyvinyl alcohol, and polyacrylic acid. Methods of adhering the hydrophilic resin to the fiber surface include a method of dissolving or dispersing the hydrophilic resin in an appropriate solvent and then submerging the fiber in the dissolution liquid or dispersion liquid, or a method of adhering the dissolution liquid or dispersion liquid to the fiber surface by applying the dissolution liquid or dispersion liquid to the fiber and then drying the fiber. Note that during hydrophilic coating, either a part of the fiber surface or the entire fiber surface may be covered, as long as the hydrophilic resin is adhered to the fiber.

The hydrophilic vinyl monomer graft polymerization processing is processing to impart hydrophilicity by graft-polymerizing a hydrophilic vinyl monomer to the fiber. Examples of the hydrophilic vinyl monomer include (meta)acrylic acid and an esther thereof, vinyl pyridine, vinyl pyrolidone, and styrene sulfate.

Examples of the sulfonation processing include processing using fuming sulfuric acid, sulfuric acid, sulfur trioxide, chlorosulfuric acid, or sulfuryl chloride.

In the fluorine gas processing, fluorine gas itself may be used, for example. Alternatively, the processing may be performed using diluted fluorine gas obtained by diluting fluorine gas with nitrogen gas or a rare gas such as argon gas. Further, a mixed gas such as diluted fluorine gas and oxygen gas or carbon dioxide gas and sulfur dioxide gas may be used.

Examples of the discharge processing include corona discharge processing, plasma processing, glow discharge processing, surface discharge processing, and electron beam processing.

Assuming that the fiber contained in the filter medium of the present invention totals 100% by mass, the content of the fiber (A) is typically between 10 and 30% by mass, preferably between 10 and 28% by mass, more preferably between 13 and 28% by mass, even more preferably between 15 and 28% by mass, and particularly preferably between 15 and 25% by mass. When the proportion of the fiber (A) is within this range, the voids required to disperse fiber (B) can be secured sufficiently. As a result, the filtering efficiency and filter life of the filter medium can be increased.

Assuming that the fiber contained in the filter medium of the present invention totals 100% by mass, the content of the fiber (C) is typically between 5 and 20% by mass, preferably between 5 and 18% by mass, more preferably between 7 and 18% by mass, even more preferably between 7 and 15% by mass, and particularly preferably between 10 and 15% by mass. When the fiber (C) content is within this range, the strength of the filter medium can be increased, and moreover, since the fiber (C) exhibits superior dispersability, the void ratio of the filter medium can be increased, enabling an extension of the filter life.

One or more types of the fiber (A) may be used. For example, a plurality of types of fiber (A) may be used together that differ in terms of at least one of the modified cross-section, the fiber diameter, and the material. More specifically, two or more types of fibers (A) having different modified cross-sections may be used together, for example. Alternatively, two or more types of fibers (A) having different fiber diameters may be used together. Further, two or more types of fibers (A) having different materials may be used together.

One or more types of the fiber (C) may be used. For example, a plurality of types of fiber (C) may be used together that differ in terms of at least one of the modified cross-section, the fiber diameter, and the material. More specifically, two or more types of fibers (C) having different modified cross-sections may be used together, for example. Alternatively, two or more types of fibers (C) having different fiber diameters may be used together. Further, two or more types of fibers (C) having different materials may be used together.

(2) Fiber (B)

The filter medium of the present invention contains an appropriate amount of the fiber (B), and therefore, during the paper-making process, the fibers (B) are dispersed evenly so as to form networks. As a result, fine filter pores are formed, and a bulky filter medium can be produced. Thus, the filtering efficiency and filter life can be increased. Note that this description is a presumption of the inventor, and is not intended to limit the present invention.

The fiber diameter of the fiber (B) is more than 5 µm and no more than 10 µm, preferably between 5.5 and 10 µm, more preferably between 6 and 9 µm, and even more preferably between 6 and 8.5 µm. When the fiber diameter of the fiber (B) is within this range, superior filtering efficiency is exhibited and the strength of the filter medium can be improved. On the other hand, when the fiber diameter of the fiber (B) exceeds the upper limit value, the filtering efficiency plateaus, which is economically undesirable.

There are no particular limitations on the material of the fiber (B), and fibers made of various materials may be used as the fiber (B) as necessary. Examples of the material of the fiber (B) include polyester such as polyethylene terephthalate (PET) and polyvinyl alcohol ("Vinylon", manufactured by Unitika Ltd., or the like). When fiber made of a material exhibiting superior hydrophilicity is used as the fiber (B), incineration of the filter medium of the present invention can be performed easily, which is desirable. Examples of the hydrophilic fiber include examples of fiber exhibiting superior hydrophilicity.

The specific gravity of the fiber (B) is typically between 0.5 and 1.3, preferably between 0.5 and 1.1, more preferably between 0.7 and 1.1, and even more preferably between 0.7 and 1.0. When the specific gravity is within this range, the fiber (B) is dispersed through the slurry appropriately such that a bulkier filter medium structure can be obtained. As a result, the filtering efficiency and filter life of the filter medium can be improved. Polypropylene may be cited as an example of a material having a specific gravity within this range.

Assuming that the fiber contained in the filter medium of the present invention totals 100% by mass, the content of the fiber (B) is between 3 and 10% by mass, preferably between 3 and 7% by mass, more preferably between 3 and 6% by mass, and even more preferably between 4 and 6% by mass. When the content of the fiber (B) is not within this range, the filtering efficiency and filter life of the filter medium decrease, which is undesirable.

(3) Other

The filter medium of the present invention requires the fiber (A), the fiber (B), and the fiber (C). As long as the performance thereof is not impaired, the filter medium of the present invention may contain one or more types of fiber other than these fibers. Examples of the other fiber include natural fiber made of cellulose or the like, and synthetic fiber such as polyester or acrylic fiber.

There are no particular limitations on the properties, shape and material of the other fiber. The other fiber may have a circular cross-section or a modified cross-section. There are no particular limitations on the cross-sectional shape and material of the modified cross-section fiber, and modified cross-section fiber having various cross-sectional shapes and materials may be used as necessary. The above description of the cross-sectional shape and material of the fibers (A) and (C) applies as is to the properties, such as the fiber diameter, cross-sectional shape, and material of the modified cross-section fiber.

The filter medium of the present invention can usually be obtained by making the respective fibers described above into paper. During paper-making, the filter medium of the present invention may be blended with a binder. By making paper using a binder, the strength and water resistance of the filter medium according to the present invention are improved, enabling an increase in the filter life. Examples of the binder include phenol resin, melamine resin, starch, polyvinyl alcohol, and latex (acrylic-based, vinyl acetate-based, epoxy-based, synthetic rubber-based, vinylidene chloride-based, and so on). There are no particular limitations on the blending proportion of the binder. The blending proportion of the binder may be set appropriately in accordance with the respective materials, properties, proportions and so on of the fibers. Assuming that the fiber in the filter medium of the present invention totals 100 parts by mass, the blending proportion of the binder is typically set between 5 and 50 parts by mass, preferably between 10 and 40 parts by mass, and more preferably between 10 and 35 parts by mass.

The filter medium of the present invention may be applied to various filters for removing microparticles and the like from a fluid.

[2] Fluid Filter and Engine Oil Filter

The fluid filter and engine oil filter of the present invention include the filter medium of the present invention. By including the filter medium of the present invention, the fluid filter and engine oil filter of the present invention exhibit high filtering efficiency and have a long filter life.

There are no particular limitations on the type of "fluid" that is filtered by the fluid filter of the present invention. The fluid may be a gas or a liquid. Specific examples of the fluid filter according to the present invention include an air filter for filtering a gas and a liquid filter for filtering a liquid. Examples of a liquid filter include an oil filter for an internal combustion engine such as an engine oil filter (particularly an automobile engine oil filter), a fuel filter, and a hydraulic filter.

The fluid filter of the present invention may be applied to an air filter that traps dust particles in the air and a fluid filter that traps microparticles contained in a fluid. The fluid filter of the present invention may be applied to an oil filter for an internal combustion engine, such as an oil filter for an automobile engine, a fuel filter, a hydraulic filter, and so on, for example.

EXAMPLES

Specific examples of the present invention will be described below. Note that the present invention is not limited to any of these examples.

The fibers used as the raw material of the filter medium are as follows.
(1) Modified cross-section fiber (A); PET fiber (fiber diameter; 50 μm) having an X-shaped cross-section.
(2) Extremely fine fiber (B); polyvinyl alcohol fiber ("Vinylon", manufactured by Unitika Ltd., fiber diameter; 7 μm).
(3) Modified cross-section fiber (C); PET fiber (fiber diameter; 22 μm) having an X-shaped cross-section.
(4) Circular cross-section fiber (with small fiber diameter); PET fiber (fiber diameter; 18 μm) having a circular cross-section.
(5) Other Fiber; Cellulose Fiber.

Each of the fibers described above and a binder (phenol resin) were dispersed in water. The proportions of the fibers are shown in Table 1. The blending proportion of the binder was set at 23 parts by mass in relation to a total 100 parts by mass of the fibers. The dispersion liquid was made into paper by a standard square manual paper-making machine. The base paper weight was 140 g/m². Drying was then performed using a cylinder drier, and thus the filter media of Examples 1-6 and Comparative Examples 1-3 were manufactured.

The respective performances of the filter media of Examples 1-6 and Comparative Examples 1-3 were investigated using the methods described below. The results are shown below in Table 1.
(A) Filtering Efficiency (%) and Filter Life (hr)
Measurement was performed on the basis of a filtering efficiency and filter life evaluation method prescribed in JIS D1611-1.
(B) Gas Permeability (sec/300 ml)
Measurement was performed using a gas permeability measuring method prescribed in JIS P8117. Note that the hole diameter of air holes provided in the tool was set at φ10 mm.
(C) Average Pore Diameter (μm)
Measurement was performed using a pore size measuring device and a bulb point method employing isopropyl alcohol.
(D) Bursting Strength (kPa)
Measurement was performed using a bursting strength measuring method prescribed in JIS P8112.
(E) Void Ratio (%)
Measurement was performed using a gravimetric method employing n-butyl alcohol.

(3) Results of the Examples

In a fluid filter, particularly an oil filter for an internal combustion engine such as an oil filter for an automobile, a filter medium that has a long filter life, does not easily become blocked, and maintains a fixed level of filtering efficiency must be used to secure a sufficient product life. It can be seen from Table 1 that the Examples 1-6, in which the fiber (C) satisfies the requirements of the present invention, achieve both a longer filter life and better filtering efficiency than the Comparative Examples 1-2, in which the fiber (C) does not satisfy the requirements of the present invention. It can also be seen that the Examples 1-6, in which the fiber (A) satisfies the requirements of the present invention, achieve both a longer filter life and better filtering efficiency than the Comparative Example 3, in which the fiber (A) does not satisfy the requirements of the present invention.

Note that the present invention is not limited to the examples described above, and various modifications may be made within the scope of the present invention, in accordance with the object and application thereof.

What is claimed is:
1. A filter medium comprising:
   a modified cross-section fiber (A) having a fiber diameter between 40 and 70 μm;
   an extremely fine fiber (B) having a fiber diameter of more than 5 μm and no more than 10 μm; and
   a modified cross-section fiber (C) having a fiber diameter between 15 and 30 μm;
   wherein the content of said extremely fine fiber (B) is between 3 and 10% by mass, and the content of said modified cross-section fiber (C) is between 5 and 15% by mass based on 100% by mass of total said fibers in said filter medium.
2. The filter medium according to claim 1, wherein said fiber diameter of said modified cross-section fiber (C) is more than 3 times and less than 6 times said fiber diameter of said extremely fine fiber (B).
3. The filter medium according to claim 1, wherein said fiber diameter of said modified cross-section fiber (C) is more than ⅕ times and no more than ¾ times said fiber diameter of said modified cross-section fiber (A).
4. The filter medium according to claim 2, wherein said fiber diameter of said modified cross-section fiber (C) is more than ⅕ times and no more than ¾ times said fiber diameter of said modified cross-section fiber (A).
5. The filter medium according to claim 1, wherein the content of said modified cross-section fiber (A) is between 10 and 30% by mass based on 100% by mass of total said fibers in said filter medium.

TABLE 1

|  |  | Examples | | | | | | Comparative Examples | | |
|---|---|---|---|---|---|---|---|---|---|---|
|  |  | 1 | 2 | 3 | 4 | 5 | 6 | 1 | 2 | 3 |
| Modified cross-section fiber (A) | | 20 | 20 | 20 | 10 | 30 | 20 | 20 | 20 | — |
| Extremely fine fiber (B) | | 6 | 6 | 6 | 6 | 6 | 6 | 6 | 6 | 6 |
| Modified cross-section fiber (C.) | | 13 | 5 | 15 | 13 | 13 | 5 | — | — | 13 |
| Circular cross-section fiber | | — | — | — | — | — | — | — | 13 | — |
| Cellulose fiber | | 61 | 69 | 59 | 71 | 51 | 64 | 74 | 61 | 81 |
| Filter life (hr) | | 22.4 | 21.8 | 22.4 | 21.3 | 29.9 | 21.8 | 18.2 | 19.1 | 17.8 |
| Filtering efficiency | 11 h | 57 | 56 | 57 | 57 | 57 | 57 | 58 | 57 | 59 |
| (%) | Final | 63 | 67 | 66 | 66 | 63 | 67 | 68 | 69 | 67 |
| Basis weight (g/m²) | | 176 | 174 | 172 | 171 | 171 | 174 | 173 | 174 | 174 |
| Tickness (mm) | | 1.1 | 1.4 | 1.4 | 1.3 | 1.6 | 1.4 | 1.1 | 1.3 | 1.2 |
| Gas permeability (sec/300 ml) | | 0.8 | 0.8 | 0.8 | 0.9 | 0.8 | 0.8 | 0.9 | 0.8 | 1.1 |
| Average pore diameter (μm) | | 134 | 134 | 127 | 106 | 144 | 134 | 129 | 124 | 91 |
| Bursting strength (kPa) | | 368 | 312 | 307 | 345 | 264 | 312 | 325 | 354 | 447 |
| Void ratio (%) | | 90.5 | 90.4 | 91.0 | 90.1 | 92.0 | 90.4 | 89.8 | 90.1 | 88.7 |

6. The filter medium according to claim 1, wherein at least one of said modified cross-section fibers (A) and (C) is a hydrophilic fiber.

7. A fluid filter comprising a filter medium,
said filter medium comprising:
 a modified cross-section fiber (A) having a fiber diameter between 40 and 70 µm;
 an extremely fine fiber (B) having a fiber diameter of more than 5 µm and no more than 10 µm; and
 a modified cross-section fiber (C) having a fiber diameter between 15 and 30 µm;
 wherein the content of said extremely fine fiber (B) is between 3 and 10% by mass, and the content of said modified cross-section fiber (C) is between 5 and 15% by mass based on 100% by mass of total said fibers in said filter medium.

8. The fluid filter according to claim 7, wherein said fiber diameter of said modified cross-section fiber (C) is more than 3 times and less than 6 times said fiber diameter of said extremely fine fiber (B).

9. The fluid filter according to claim 7, wherein said fiber diameter of said modified cross-section fiber (C) is more than ⅕ times and no more than ¾ times said fiber diameter of said modified cross-section fiber (A).

10. The fluid filter according to claim 8, wherein said fiber diameter of said modified cross-section fiber (C) is more than ⅕ times and no more than ¾ times said fiber diameter of said modified cross-section fiber (A).

11. The fluid filter according to claim 7, wherein the content of said modified cross-section fiber (A) is between 10 and 30% by mass based on 100% by mass of total said fibers in said filter medium.

12. The fluid filter according to claim 7, wherein at least one of said modified cross-section fibers (A) and (C) is a hydrophilic fiber.

13. A engine oil filter comprising a filter medium,
said filter medium comprising:
 a modified cross-section fiber (A) having a fiber diameter between 40 and 70 µm;
 an extremely fine fiber (B) having a fiber diameter of more than 5 µm and no more than 10 µm; and
 a modified cross-section fiber (C) having a fiber diameter between 15 and 30 µm;
 wherein the content of said extremely fine fiber (B) is between 3 and 10% by mass, and the content of said modified cross-section fiber (C) is between 5 and 15% by mass based on 100% by mass of total said fibers in said filter medium.

14. The engine oil filter according to claim 13, wherein said fiber diameter of said modified cross-section fiber (C) is more than 3 times and less than 6 times said fiber diameter of said extremely fine fiber (B).

15. The engine oil filter according to claim 13, wherein said fiber diameter of said modified cross-section fiber (C) is more than ⅕ times and no more than ¾ times said fiber diameter of said modified cross-section fiber (A).

16. The engine oil filter according to claim 14, wherein said fiber diameter of said modified cross-section fiber (C) is more than ⅕ times and no more than ¾ times said fiber diameter of said modified cross-section fiber (A).

17. The engine oil filter according to claim 13, wherein the content of said modified cross-section fiber (A) is between 10 and 30% by mass based on 100% by mass of total said fibers in said filter medium.

18. The engine oil filter according to claim 13, wherein at least one of said modified cross-section fibers (A) and (C) is a hydrophilic fiber.

* * * * *